Sept. 11, 1928.

P. E. KELLER

MOTOR SUPPORT

Filed Aug. 30, 1926

1,683,622

Inventor
P. E. Keller
by W. H. Lieber
Attorney

Patented Sept. 11, 1928.

1,683,622

UNITED STATES PATENT OFFICE.

PAUL E. KELLER, OF MILWAUKEE, WISCONSIN, ASSIGNOR, BY MESNE ASSIGNMENTS, TO AMERICAN ELECTRIC MOTOR COMPANY, OF MILWAUKEE, WISCONSIN.

MOTOR SUPPORT.

Application filed August 30, 1926. Serial No. 132,641.

This invention relates in general to improvements in the construction of enclosures and supports for machines such as electric motors, and is especially applicable to the mounting of motors from which rotary motion is transmitted through flexible driving bands or belts.

An object of the invention is to provide an improved motor mounting and housing which will enable efficient transmission of power and which will also permit convenient inspection or removal of the motor.

The invention consists generally in mounting the driving motor within the frame of a motor driven machine, in such manner that removal of a closure plate for the machine frame will simultaneously withdraw the motor for inspection. The invention further provides for movably associating the motor with the closure plate so that at least a portion of the weight of the motor is utilized to properly tension the driving belt of the machine. In cases where the entire weight of the motor is more than necessary to produce proper tensioning of the belt, the invention makes provision for utilizing only the desired portion of the motor weight for belt tensioning purposes, and for effectively supporting the excess weight of the motor upon the frame of the machine. These and other objects and advantages of the present improvement will be apparent from the following description.

A clear conception of an embodiment of the invention in a motor driven grinder, may be had by referring to the drawing accompanying and forming a part of this specification in which like reference characters designates the same or similar parts in the various views.

Figures 1, 2:
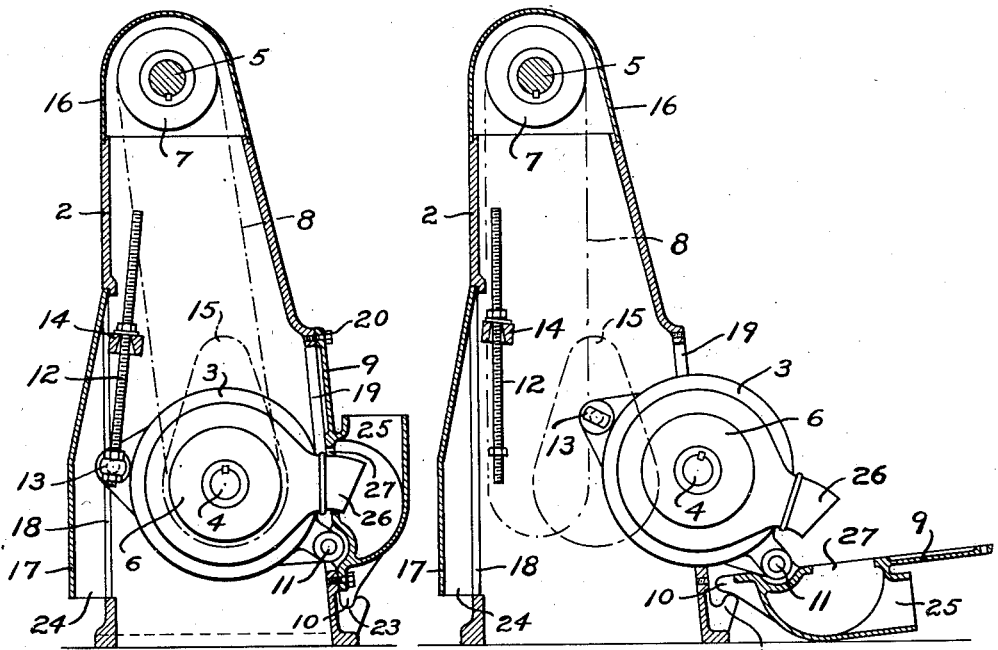
Fig. 1 is a transverse vertical section through a motor driven grinder embodying the invention, the machine being completely assembled and ready for normal operation.
Fig. 2 is a transverse vertical section through the motor driven grinder showing the front closure plate displaced and the motor withdrawn for inspection.
Figure 3:
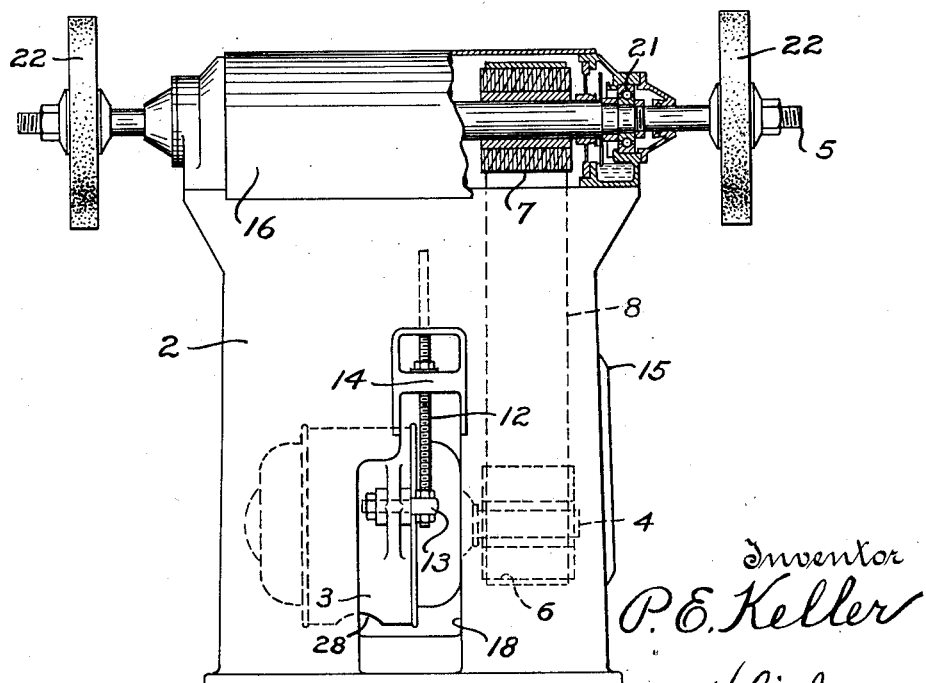
Fig. 3 is a part sectional rear elevation of the motor driven grinder with the rear hood removed.

While the invention has been embodied in a motor driven grinder by way of illustration, it is not intended to thereby limit the scope of the claims. The improved motor housing and support comprises in general a main frame or casing 2 having a front opening 19 which is normally sealed by means of a forwardly swingable closure plate 9; a horizontal driven shaft 5 rotatably supported in bearing structure 21 mounted in the upper portion of the casing 2; an electric motor 3 having a driving shaft 4, located entirely within the casing 2 and movably associated with the closure plate 9 by means of a horizontal pivot 11 or otherwise; and an endless flexible band or belt 8 drivingly connecting pulleys 6, 7 secured to the driving and driven shafts 4, 5 respectively.

Besides the front opening 19, the main casing has a rear opening 18 which is normally partly covered by means of a detachable hood 17, and an end opening which is normally sealed by a closure plate 15. The detachable cover 16 coacting with the top of the casing 2 normally encloses the ball bearing structure 21 and the upper end of the casing 2. The rear hood 17 is formed to provide an air discharge or ventilating passage 24 communicating with the interior of the casing 2 through the rear opening 18, and similar communication is afforded through the front casing opening 19 by virtue of an air supply or ventilating passage 25 formed in the closure plate 9. The front closure plate is also provided with openings 27 formed to receive air inlet conduits 26 at the opposite ends of the motor 3, and the motor housing has an air discharge opening 28 communicating with the interior of the casing 2.

The front closure plate 9 has pivot lugs 10 at its lower extremity, which coact with pivot recessess 23 formed in the main casing 2, to provide a horizontal pivotal mounting for the plate 9. Cap screws 20 coacting with the upper portion of the plate 9 serve to normally retain this plate in assembled position. The front opening 19 is of sufficient size to permit free withdrawal of the motor 3 therethrough, and the motor pivot 11 is so disposed that substantial removal of the motor 3 is effected when the front closure plate 9 has been swung forward as shown in Fig. 2.

Located within the casing 2 adjacent to the rear opening 18, is an adjusting bridge 14 which is formed integral with the casing 2 and has a tapered hole therethrough. A threaded adjusting rod 12 carries a nut which coacts with the top of the bridge 14 and has its lower end secured to a portion of the motor 3 remote from the pivot 11, by means of a swivel connection 13. The disposition of these elements is such that any desired portion of the weight of the motor 3 may be caused to bear upon and tension the belt 8. The belt tensioning mechanism is conveniently accessible through the rear opening 18 upon removal of the rear hood 17.

As shown, the opposite projecting ends of the driven shaft 5 are provided with abrasion wheels 22. These wheels 22 may obviously be replaced by any other type of energy absorbing devices, without departing from the spirit of the present invention.

During normal operation of the grinder, the parts are assembled as shown in Fig. 1, and rotary motion may be transmitted from the motor 3 to the abrasion wheels 22 through the shafts 4, 5, pulleys 6, 7, and the belt 8 in an obvious manner. By properly positioning the adjusting nut on the threaded rod 12, any desired portion of the weight of the motor 3 may be utilized to tension the belt 8. The belt 8 may be removed endwise from the lower pulley 6 upon removal of the end closure plate 15, and the motor may be quickly withdrawn for inspection through the front opening 19 as shown in Fig. 2, by releasing the coupling connection 13 and the closure plate 9 and subsequently swinging the latter forward to a horizontal position. It will thus be apparent that the improved motor support while serving the function of an efficient belt tensioner, also permits convenient withdrawal of the motor from its enclosure for inspection or repair.

The ventilating ducts or passages 25, 24 afford means for conducting relatively clean air to and from the interior of the casing 2 in order to ventilate the motor 3. The fresh air entering the passage 25, enters the motor 3 through the conduits 26 and the air delivered from the motor through the opening 28 is eventually discharged through the passage 24. The openings 27 of the closure plate 9 permit adjustment of the motor 3 to vary the belt tension, without permitting the air which enters the passage 25, to enter the casing 2 without passing through the motor, and a fixed fresh air supply connection may be made with the passage 25 without interfering with adjustment of the motor 3. This feature is extremely important in connection with grinders where the air in the immediate vicinity of the machine is usually polluted with dust.

While it has heretofore been proposed to utilize the weight of a motor or similar driving device to tension a power transmitting belt, it has not previously been attempted to combine the suspension of a motor for belt tensioning purposes with an enclosing structure therefor in such manner that removal of a closure plate would simultaneously withdraw the motor for inspection. This combination provides a compact and efficient power transmission mechanism and enables the use of the main frame of the driven machine to provide a housing for the mechanism from which the parts may be rapidly withdrawn for special purposes.

It should be understood that it is not desired to limit the invention to the exact details of construction herein shown and described for various modifications within the scope of the claims may occur to persons skilled in the art.

It is claimed and desired to secure by Letters Patent:—

1. In combination, a casing, a side closure plate horizontally pivotally associated with said casing close to the bottom thereof, a motor horizontally pivotally attached to said plate near to, but above the pivotal point of the plate, within said casing, whereby the motor weight is applied to the plate near its fulcrum, means for adjustably sustaining a portion of the weight of said motor on the opposite side from the horizontal pivot thereof, and a flexible belt for sustaining the remainder of the weight of the motor.

2. In combination, a casing, a closure plate detachably fulcrumed at its end on one side of said casing near the bottom thereof, a motor pivotally suspended from said plate near its fulcrum whereby when the plate is moved on its fulcrum the motor is withdrawn through the opening normally closed by said closure plate, a vertically adjustable rod suspended from the opposite side of said casing and having its depending end secured to said motor remote from the pivotal support of the latter, a belt coacting with said motor between said rod and said pivotal motor support, and a detachable hood carried by the casing for permitting access to the rod adjustment.

3. In combination, a casing having a plurality of openings therein with closure plates for the same, and fulcrum recesses between the lower edge of one of said openings and the bottom of the casing, a closure plate for said last mentioned opening having pivot lugs on its lower extremity to fit the said fulcrum recesses, a motor pivotally attached to said plate closely adjacent said pivot lugs, whereby the motor may be completely withdrawn from the casing, a belt within said casing cooperating with said motor and partially supporting the same, means for adjusting the tension of said belt by varying the pressure exerted thereon by said motor, said adjusting means being operable through an opening normally closed by another of said closure plates.

4. In combination, a casing having front and rear openings, a closure plate for said front opening having a ventilating duct therein, a motor pivotally suspended from said plate and having ventilating conduits leading to the interior of the motor, one of said conduits being in cooperative relationship with the ventilator duct in said closure plate, an adjustable rod within said casing and accessible through said rear opening, said rod providing an adjustable support for a portion of said motor remote from its pivotal support, a belt within said casing co-acting with said motor and a detachable hood for the rear opening and a ventilating duct formed by said hood for the purpose described.

In testimony whereof, the signature of the inventor is affixed hereto.

PAUL E. KELLER.